US008696365B1

(12) United States Patent
Bainbridge et al.

(10) Patent No.: US 8,696,365 B1
(45) Date of Patent: Apr. 15, 2014

(54) SYSTEM FOR DEFINING, TRACKING, AND ANALYZING STUDENT GROWTH OVER TIME

(71) Applicant: Align, Assess, Achieve, LLC, Worthington, OH (US)

(72) Inventors: Kathleen M. Bainbridge, Columbus, OH (US); Sheila M. Wallace, New Albany, OH (US); John L. Wallace, New Albany, OH (US); Maurice R. Holman, Westerville, OH (US)

(73) Assignee: Align, Assess, Achieve, LLC, Worthington, OH (US)

( * ) Notice: Subject to any disclaimer, the term of this patent is extended or adjusted under 35 U.S.C. 154(b) by 0 days.

(21) Appl. No.: 13/896,974

(22) Filed: May 17, 2013

Related U.S. Application Data (60) Provisional application No. 61/649,011, filed on May 18, 2012.

(51) Int. Cl.
*G09B 25/00* (2006.01)

(52) U.S. Cl.
USPC ........... 434/365; 434/118; 434/156; 434/322; 434/323; 434/350; 434/353; 434/362; 705/1.1; 705/7.38; 705/7.39; 707/792; 707/802

(58) Field of Classification Search
USPC ......... 434/118, 156, 322, 323, 350, 353, 362, 434/365; 705/1.1, 7.38, 7.39; 707/792, 802
See application file for complete search history.

(56) References Cited

U.S. PATENT DOCUMENTS

| | | | |
|---|---|---|---|
| 6,144,838 A * | 11/2000 | Sheehan | 434/362 |
| 6,676,412 B1 * | 1/2004 | Masterson et al. | 434/169 |
| 7,311,524 B2 * | 12/2007 | Jennen et al. | 434/323 |
| 7,408,101 B2 | 8/2008 | Shelton | |
| 7,512,627 B2 | 3/2009 | Hossfeld et al. | |
| 7,937,416 B2 | 5/2011 | Hossfeld et al. | |
| 8,202,099 B2 | 6/2012 | Lancaster | |
| 8,439,684 B2 * | 5/2013 | MacGregor et al. | 434/178 |
| 2001/0031458 A1 | 10/2001 | Schramm | |
| 2002/0023095 A1 * | 2/2002 | Baba et al. | 707/104.1 |
| 2002/0034719 A1 * | 3/2002 | Ikezawa et al. | 434/350 |
| 2003/0064354 A1 | 4/2003 | Lewis | |
| 2003/0113697 A1 | 6/2003 | Plescia | |
| 2003/0134261 A1 * | 7/2003 | Jennen et al. | 434/354 |
| 2004/0024776 A1 | 2/2004 | Moore et al. | |
| 2004/0093346 A1 | 5/2004 | Hochman | |
| 2004/0157201 A1 * | 8/2004 | Hollingsworth et al. | 434/350 |
| 2004/0219503 A1 | 11/2004 | Lewis | |
| 2005/0100875 A1 * | 5/2005 | Best et al. | 434/362 |

(Continued)

OTHER PUBLICATIONS www.qualityinstruction.org/content_lit.html, "Training: Content Literacy Skills in the 4-12 Classroom", May 31, 2011, www.qualityinstruction.org, pp. 1-2.*

(Continued)

*Primary Examiner* — Jack Yip
(74) *Attorney, Agent, or Firm* — Frost Brown Todd LLC (57) ABSTRACT

Student growth can be defined, tracked, and analyzed using a method that comprises PLAN, ASSESS and REFLECT steps, potentially in conjunction with related sub-steps. This type of method can be facilitated using computer software that can be deployed over a remote network, and that can present a number of screens relevant to defining, tracking and analyzing student growth to a user.

2 Claims, 12 Drawing Sheets

(56) References Cited

U.S. PATENT DOCUMENTS

| | | | | |
|---|---|---|---|---|
| 2005/0196742 | A1* | 9/2005 | Harber et al. | 434/362 |
| 2005/0209994 | A1 | 9/2005 | Noro et al. | |
| 2005/0244802 | A1* | 11/2005 | MacIlroy et al. | 434/322 |
| 2006/0084048 | A1* | 4/2006 | Sanford et al. | 434/323 |
| 2006/0099563 | A1* | 5/2006 | Liu et al. | 434/350 |
| 2006/0115801 | A1 | 6/2006 | Ganley et al. | |
| 2006/0141430 | A1 | 6/2006 | Hutchinson et al. | |
| 2006/0141441 | A1 | 6/2006 | Hutchinson et al. | |
| 2006/0173817 | A1* | 8/2006 | Chowdhury et al. | 707/3 |
| 2007/0231782 | A1* | 10/2007 | Ozawa et al. | 434/350 |
| 2007/0269778 | A1* | 11/2007 | Sexton | 434/156 |
| 2007/0298384 | A1* | 12/2007 | Jenkins et al. | 434/156 |
| 2008/0124696 | A1 | 5/2008 | Houser et al. | |
| 2009/0068625 | A1 | 3/2009 | Petro et al. | |
| 2009/0269730 | A1 | 10/2009 | Nguyen et al. | |
| 2009/0325140 | A1* | 12/2009 | Gray et al. | 434/353 |
| 2010/0055662 | A1 | 3/2010 | Betebenner | |
| 2010/0062411 | A1* | 3/2010 | Bartholomew | 434/350 |
| 2010/0184009 | A1* | 7/2010 | Rajkowski | 434/159 |
| 2010/0190145 | A1* | 7/2010 | Singer et al. | 434/335 |
| 2010/0279265 | A1 | 11/2010 | Heffernan | |
| 2011/0066005 | A1* | 3/2011 | Rotenberg | 600/301 |
| 2011/0189643 | A1 | 8/2011 | Hutchinson et al. | |
| 2011/0307396 | A1* | 12/2011 | Hewitt et al. | 705/317 |
| 2012/0308980 | A1* | 12/2012 | Krauss | 434/362 |
| 2012/0329029 | A1* | 12/2012 | Rauta | 434/350 |

OTHER PUBLICATIONS

ActiveGuide™, Jan. 2012, ActiveGrade, LLC, http://activeguide.com

Austin Independent School District, Student Learning Objectives, http://www.archive.austinisd.org/inside/initiatives/compression/slos.phtml.

Battelle for Kids, May 2012, Battelle Memorial Institute www.battelleforkids.org (visited http://en.wikipedia.org/wiki/Battelle_for_Kids).

Charlotte-Mecklenburg Schools, TIF-Leap, http://www.cms.k12.nc.us/cmsdepartments/Tif-Leap/Pages/StudentLearningObjectives.aspx.

Colorado Department of Education (CDE), Educator Effectiveness, A Colorado Priority, http://www.cde.state.co.us/EducatorEffectiveness/StudentGrowthGuide.asp.

Georgia Department of Education, Introduction to the Georgia Student Growth Model, Student Growth Percentiles, http://www.doe.k12.ga.us/School-Improvement/Teacher-and-Leader-Effectiveness/Documents/Intro%20to%20SGP%20ppt%20Presentation.pdf.

Goe, L., "Evaluating Teaching with Multiple Measures," National Comprehensive Center for Teacher Quality, A Union of Professionals, American Federation of Teachers, http://www.lauragoe.com/lauragoe/EvalTchgWithMultipleMeasures.pdf.

Goe, L., et al., "Measuring Teachers' Contributions to Student Learning Growth for Nontested Grades and Subjects," National Comprehensive Center for Teacher Quality, Feb. 2011, Research & Policy Brief, http://www.lauragoe.com/LauraGoe/MeasuringTeachersContributions.pdf.

GradeBookWizard.com, 2003-2012 Blue Pegasus LLC, www.gradebookwizard.com.

JupiterGrades, 2004-2013 Jupiter Ed, http://jupiterred.com.

Khan Academy, Jan. 2012, Khan Academy, www.khanacademy.org.

Louisana Department of Education, Compass, Louisiana's Path to Excellence, Teacher Evaluation Guidebook, 2012-13, http://www.louisianaschools.net/lde/uploads/20118.pdf.

New York Engage Site, Student Learning Objectives, http://www.engageny.org/resource/student-learning-objectives.

Rhode Island Department of Education (RIDE), Teachers & Administration, http://www.ride.ri.gov/TeachersAdministrators/EducatorEvaluation/RIModelFAQsand.Guidance/tabid/416/LiveAccId/12834/Default.aspx.

State of Delaware, Using Student Growth to Evaluate Teacher Effectiveness in Delaware, Delaware Department of Education, http://www.doe.k12.de.us/csa/dpasii/student_growth.

TeacherEase, 2001-2013 Common Goal Systems Inc., www.teacherease.com.

ThinkWave, 1998-2013, www.thinkwave.com.

University of Rhode Island, Student Learning outcomes 101, Jun. 24, 2007, 1 http://www.uri.edu/assessment/media/public/page_files/uri/outcomes/student/outcomes/outcomes_tools/Handout_Student_Learning_Outcomes_101_8_7_06.pdf.

* cited by examiner

Figure 1

| Rationale | Population | Standards | Assessments | Timeframe | Growth Target |
|---|---|---|---|---|---|
| ▶ Functions | Whole class, 30 students | CCSS/Functions | Pre-assessment, Selected Response Assessment, and End of Semester | 18 weeks | G Y R |
| ▶ Statistics | Whole class, 30 students | CCSS/Statistics | Pre-assessment, Selected Response Assessment, and End of Semester | 18 weeks | G Y R |
| ▲ Number and Qu... | Whole class, 30 students | CCSS/Numbers on... | Pre-assessment, Select... | 18 weeks | Show |

FIG. 5 company   contact us   blog greenslope   Plan   Assess   Reflect   Settings   Search Number and Quantity Mrs. Jones

| | Functions SLO | Statistics SLO | Number and Q SLO |

Period 1: Pre-Algebra

◁▷   ◁▷   ◁▷

Abbott, Tommy
Beck, Billy
Busto, Marlon
Deroissi, Suzy
Hermit, Herman
Hosten, Darlene
Lehan, Boyd
Manduca, Frodo
Manne, Isa
Roberts, William
Plueger, Inocencia
Ziggy Square

FIG. 8 greenslope — Plan | Assess | Reflect company · contact us · blog · Settings · Search

[Delete] [Save]

Title — by Mrs. Jones, May 8, 2012

Enter text for your narrative (teammates) (SLO # 2) [+]

---

A note for my observation
by Mr. Morgan, May 8, 2012

Mrs. Jones it was great to be in your classroom today. As I review your SLO, I noticed that you are placing larger emphases this year on mathematical practices. This was evident with the lesson on the addition and subtraction to 20. Focussing on the mathematical practices within your lessons will help guide your students to a better understanding on the math concept of addition and subtraction versus the use of an algorithm. This focus will impact your overall goal of student growth in this area. I am interested to see another data point around this SLO.

(mathematical practice) (data point) (SLO)

---

Planning for our next round of assessments  [Edit]
by Mrs. Jones, May 8, 2012

As I review data, I notice that my students are not making adequate progress toward SLO#2 (adding and subtracting to 20). I have met with my teammates to discuss other methods of instruction tha will impact the deeper understanding of addition and subtraction. The research and my teammates suggest moving back to ten frames and making sure they understand the basics of adding and subtracting around ten.

I do have 4 students who are fluently adding and subtracting up to 20. I am going to work on adding 3 factors and moving towards multi-step problems.

(teammates) (SLO # 2) (assess)

SYSTEM FOR DEFINING, TRACKING, AND ANALYZING STUDENT GROWTH OVER TIME

CROSS REFERENCE TO RELATED APPLICATIONS

This application claims the benefit of, and is a non-provisional of, U.S. provisional patent application 61/649,011, filed on May 18, 2012 and having the same inventors and title as listed above. The disclosure of that application is hereby incorporated by reference in its entirety.

BACKGROUND

Present day educational technology such as computer and online grade books are used to organize information, store data and perform calculations about student learning. These often include places to enter educational standards and assignments such as homework, tests, and quizzes. Some report mastery of standards while others report using the more traditional A-F scale. Regardless, these systems all have one thing in common; they are used to report student learning in terms of student mastery. Student mastery can be thought of as a measurement of the level to which a student has attained the knowledge, reasoning and skills expected.

While mastery information can be beneficial, it is limited in a number of ways, including that it often fails to meaningfully reflect or measure student growth. In the current state of the art, even when individuals decide they want to measure student growth, there is no available technology that can be used to define growth targets, compute and report student growth over time, or using that information to provide meaningful feedback. Accordingly, there is a need in the art for technology which can be used in defining, tracking, and analyzing growth.

SUMMARY

Disclosed herein is technology that can be used for purposes such as allowing users to measure growth for all students regardless of content, grade, and skill level; allowing users to calculate growth in multiple ways; allowing user input on growth expectations; presenting users with current and ongoing data about students; and representing where a student is relative to the growth target at a given point in time. Using such technology, growth can be aligned to standards, but students may not be required to meet the standards to show growth.

BRIEF DESCRIPTION OF THE DRAWINGS

The drawings and detailed description that follow are intended to be merely illustrative and are not intended to limit the scope of protection accorded by this or any related document.

FIG. 9 depicts a screen that could be presented to facilitate completion of a REFLECT step.

DETAILED DESCRIPTION

For the purpose of illustration, the following description sets forth details regarding a software tool and a method that could be performed using the inventors' technology. While this method and associated tool represent preferred embodiments of the inventor's technology, their description should be understood as being illustrative only, and should not be used to limit the scope of protection accorded by this or any related document. Other examples, features, aspects, embodiments, and advantages of the inventors' technology will become apparent to those skilled in the art, and could be implemented by such individuals without undue experimentation, based on the following description. Accordingly, the drawings and descriptions set forth herein should be understood as illustrative only, and should not be used to infer limitations on the protection accorded by any claims included in any patent or application that is related to, or claims the benefit of, this document.

Figure 1:
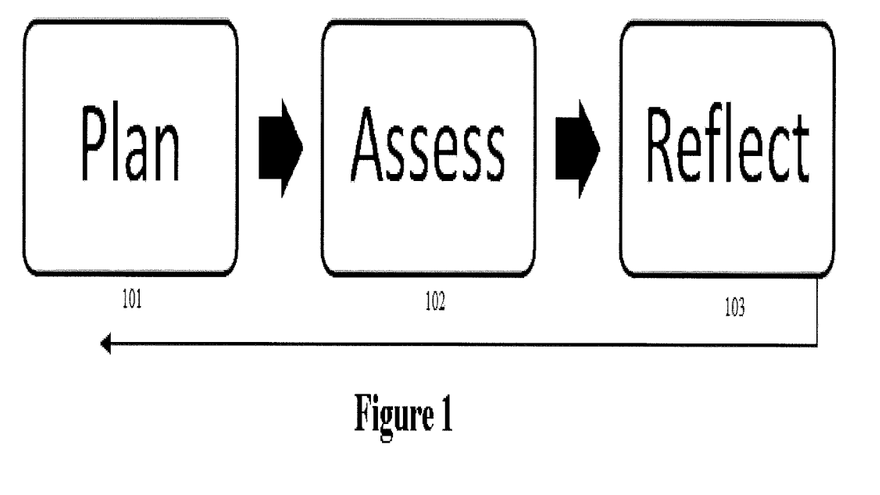
FIG. 1 illustrates steps in a method implemented using aspects of the inventors' technology.

Turning now to the figures, FIG. 1 provides a high-level illustration of a method that could be performed using the inventors' technology to allow users (generally, these will be educators, such as teachers, principals, curriculum directors, or district administrators, though they could also be non-educators, such as parents or outside evaluators from a legislature or department of education) to define, track and analyze growth.

In a method following the high level sequence of FIG. 1, the initial PLAN step [101] could be used to plan and create one or more student learning objectives (abbreviated SLOs herein). This step could be implemented in a variety of manners, and may involve a variety of sub-steps. For example, sub-steps involved in planning and creating a SLO can comprise one or more of: (1) performing a rationale or needs assessment to determine and document an area of need for a student; (2) identifying a specific target population for which growth is being sought; (3) identifying the educational standard addressed; (4) the determining one or more assessments used to measure student progress (generally, this will involve verifying that there are at least two opportunities to administer the particular assessment being evaluated); (5) establishing the time covered by the SLO (e.g., 6 weeks, 9 weeks, 12 weeks, 27 weeks, 36 weeks, etc.); and, (6) identifying the target for student growth. Additional information about these steps is provided in below in Table 1, and the following discussion.

TABLE 1

Implementation, support and purpose information for exemplary PLAN phase steps.

| Sub-Step | Purpose | Activities |
|---|---|---|
| Rationale | To determine and document an area of need for one or more students. | Identify specific needs of the students within a class (generally, if the individual performing the method is a teacher, then this class will be one taught by that teacher) along with an explanation of how the need was determined. Student needs could be based on a number of things such as test data from the previous year; pre-assessment data; areas of focus identified by your building, district, or standards; and current research. Preferably, will include identification of 2-4 different areas of need that the user intends to address (or have addressed). |
| Population | To identify a specific population for which growth is being sought. | Describe the population in which intend to measure growth. This will preferably include should identifying a population for each need identified in the previous step. The populations could range from all students to a particular sub group. |
| Standard | To identify the specific standard(s) addressed | Identify the standard(s) for which a specific need is discovered. These standards could be: Common Core Standards, National Standards, and/or State Standards. |
| Assessment | To describe the assessment used to measure student progress. | Develop an assessment plan for measuring student growth. Preferably, the assessments should be both rigorous and aligned to the identified standards. The assessment plan will preferably be developed to have multiple assessments in order to generate multiple data points and will preferably contain both formative (during the learning) and summative (final) assessments. |
| Timetable | To establish period of time covered by SLO. | Determine the amount of time after which the growth target should have been achieved( e.g., based on the end of an academic period). |
| Growth Target | To identify teacher and/or student growth targets. | Determine the method for calculating the student growth targets (and/or teacher growth targets, if appropriate in a given situation). Preferably, the targets will be both realistic and challenging. Details on how this can be performed are set forth in the text. |

As a further illustration of how the PLAN step [101] could be performed, and, in particular, to provide an expanded discussion of the growth target determination sub-step, consider that the inventors' technology could be implemented to support a plurality of approaches to measuring and defining growth. For example, in some cases, the inventors' technology could be used to measure and define growth using both individual growth calculations (e.g., calculations in which each individual student has their own individual growth target) and tiered growth calculations (e.g., calculations in which individual student growth targets are based on placing the students into tiers). Descriptions those approaches to measuring and defining growth for students are set forth below.

Turning first to individual approaches to growth, a preferred method for utilizing the inventors' technology will use these approaches when there are assessments with an output that translates into a percentage or point value. At a high level, these individual approaches allow a user (e.g., an educator) to set growth targets, that can have varying degrees of rigor. The growth targets, along with scores from initial assessments, are then used to project a target scores and expected growth ranges. For example, in one implementation of an individual approach to growth, a user will use percentage scales to define growth targets. Preferably, this definition of growth targets will include definition of both a bottom and top threshold for expected growth. As a concrete illustration of these individual percentage growth targets, consider the case of a student who scores 25 out of 100 possible on an initial assessment test. If a 50/50 percentage growth target were used, then, to reach a minimum expected growth, the student would need to improve his or her score to at least 63 by the end of the assessment period (63=25+(100−25)*50%, rounded up). To exceed the growth expectations, the student would have to improve his or her score to at least 82 by the end of the assessment period (82=63+(100−63)*50%, rounded up).

Of course, the use of a 50/50 percentage growth target in the above example should be understood as illustrative only, and other growth targets (e.g., 20/80, 25/75, 33/66) could be used as well. In general, regardless of the growth targets used, the points necessary to achieve to reach or exceed expected growth defined as individual percentage growth targets can be determined as follows:

$$S_{Min\_Final} = S_{Actual\_Initial} + (S_{Max\_Initial} - S_{Actual\_Initial}) * E_{Min\_Percent}/100$$

$$S_{Max\_Final} = S_{Min\_Final} + (S_{Max\_Initial} - S_{Min\_Final}) * E_{Max\_Percent}/100$$

In the above equations $S_{Min\_Final}$ is the minimum score the student needs to achieve by the end of the assessment period to reach expected growth. $S_{Actual\_Initial}$ is the student's actual score on an initial assessment. $S_{Max\_Initial}$ is the maximum score possible on the initial assessment. $E_{Min\_Percent}$ is the threshold percentage improvement to reach expected growth. $S_{Max\_Final}$ is the minimum score needed to exceed expected growth. $E_{Max\_Percent}$ is the threshold percentage improvement to exceed expected growth.

Of course, just as the numbers used in the 50/50 growth example should not be treated as limiting on individual percentage growth target calculations, the percentage growth target calculations should not be treated as implying limitations on individual metrics for growth that could be implemented using the inventors' technology. For example, as an alternative to the percentage growth calculations above, it is also possible that individual approaches to growth could be implemented using an individual point growth calculation. For these types of calculation, a user could provide point goals for students and those point goals would then be applied to the student's starting scores. To illustrate, if a student scores 25 on an initial assessment, and the user had set a 15/45 point growth target, then the user would need to improve his or her score to at least 40 to reach expected growth, and 70 to exceed expected growth. Additional alternatives are also possible. For example, instead of using percentages or point improvement, growth might be defined in terms of other measures, such as percentiles (e.g., to reach expected growth, a student might need to move from the $30^{th}$ percentile to the $40^{th}$ percentile).

Similarly, in some cases targets could be defined in such a way that a student could achieve expected growth even if his or her score decreased between initial and final assessments. For example, there could implementations where, once a student has scored above some threshold (e.g., a mastery threshold of more than 95/100 on an initial assessment), then any score on the final assessment that was also above that threshold would be treated as consistent with expected growth. Different types of individual growth calculations could also be combined. For example, in some implementations, a user could use define one type of growth target (e.g., percentage growth) for a first student, and another type of growth target for a second student (e.g., a point based growth target). Other variations are also possible, and will be immediately apparent to those of ordinary skill in the art in light of this disclosure. Accordingly, the discussion of specific individual growth calculations above should be understood as being illustrative only, and not limiting.

Turning next to tiered approaches to growth, a preferred method of using the inventor's technology will include using these approaches when calculating growth using assessments containing a rubric or scoring criteria that does not easily translate into a percentage (e.g., a rubric that is based on 1-6) or using an assessment with a fixed score (e.g., the Developmental Reading Assessment). At a high level, these approaches allow a user (e.g., a teacher) to place students into different groupings, and then to define growth targets which apply only to those groups. For example, a teacher could separate students into four tiers, and set specific growth targets for each of the tiers as shown below in Table 2:

TABLE 2

Exemplary tiers and growth targets.

| Tier 1 Range (1-3) | | Tier 2 Range (4-6) | | Tier 3 Range (7-9) | | Tier 4 Range (10-12) | |
|---|---|---|---|---|---|---|---|
| Yellow | 4-9 | yellow | 7-12 | yellow | 10-15 | yellow | 13-16 |
| Green | 10-18 | green | 13-18 | green | 16-18 | green | 17-18 |

Using the tiers shown in Table 2, if a student scores anywhere from 1-3 on an initial assessment, he or she would need to improve his or her score to at least 4 to reach expected growth, and would have to improve his or her score to at least a 10 to exceed expected growth.

Of course, other approaches to calculating growth targets using tiers are also possible. For example, instead of setting absolute scores for each tier, a tiered approach could be implemented to allow a user to set improvement levels for students in the various tiers. As an illustration of this, consider the tiers and growth targets set forth in Table 3:

TABLE 3

Exemplary tiers and growth targets.

| Tier 1 Range (1-3) | | Tier 2 Range (4-6) | | Tier 3 Range (7-9) | | Tier 4 Range (10-12) | |
|---|---|---|---|---|---|---|---|
| yellow | +7 | yellow | +6 | yellow | +5 | yellow | +4 |
| green | +9 | green | +8 | green | +7 | green | +6 |

Using the tiers shown in Table 3, if a student scored a 2 (first tier) on the initial assessment, then he or she would have to improve his or her score to a 9 to reach expected growth, and would have to improve his or her score to a 11 to exceed expected growth. Additional variations could also be implemented. For example, tiers and growth targets could be defined in terms of percentages or percentiles (assuming that appropriate data to make the percentage or percentile determinations is available). Similarly, as was the case with the individual approaches different types of growth targets could be combined in the tiered approaches, and, in some implementation, negative growth could be accommodated.

Other variations are also possible. For example, while the above discussion of the tiered and individual approaches to calculating growth focused on calculating growth for students, the inventors' technology could also be used to calculate non-student growth. To illustrate, consider the task of defining growth targets (and/or calculating growth) for teachers. Preferably, when targets for student growth are being defined, similar targets will be defined for teachers. Like the student targets, these teacher growth targets could be set forth in terms of percentages such as a target that 75% of a teacher's students will improve their scores by at least 30 points. Multiple thresholds could also be provided. For example, as with students, teachers could have thresholds set for both meeting and exceeding expectations. These could be directly transferred from student targets (e.g., the teacher could have a first threshold target of 75% of his or her students achieving expected growth, and could have a second threshold target of 75% of students exceeding expected growth) but could also be based on more aggregated data (e.g., the teacher could have a first threshold target of 75% of students reaching expected growth, and a second threshold target of 85% of students reaching expected growth).

These thresholds could also be calculated and adjusted on an ongoing basis (e.g., quarterly, yearly, etc.) to provide growth data for teachers in a similar manner as described above for students. For example, a teacher who has 65% of his or her students reaching their growth targets in a first year could have a goal set to have 75% of his or her students reaching their growth targets for the following year. This information could then be used for purposes such as identifying areas where teacher training is deficient, or identifying teachers who have significantly improved their ability to impart knowledge to students, and requesting that they help prepare training materials that could be provided to others. Other approaches are also possible, and will be immediately apparent to those of ordinary skill in the art in light of this disclosure. Accordingly, the discussion set forth above regarding the definition of growth targets should be understood as being illustrative only, and not limiting.

Turning now to the second step in the high level method of FIG. 1, the ASSESS step [102] can involve gathering, storing and analyzing data so that growth can be monitored on an ongoing basis. For example, in the case where multiple formative (during learning) assessments were identified during the PLAN step [101] from FIG. 1, the ASSESS step [102] could involve administering those assessments, converting their results to a scale that is comparable to that used to define the growth targets (e.g., converting a raw score to a percent or percentile, preferably using the approach determined during the PLAN step [101]), and then providing those results in a format that is easily understood by the relevant individuals (e.g., a graph showing whether a student is on track to meet or exceed growth expectations given the relevant growth target). This will allow the individual using the inventors' technology (e.g., a teacher) to identify issues (e.g., students who are not on track to reach expected growth) and take appropriate remedial action (e.g., providing additional support for students who are not on track to reach expected growth).

Finally, the high level method of FIG. 1 concludes with the REFLECT step [103], that can be used for evaluating the results of the period under consideration, soliciting, receiving and/or providing feedback and/or guidance, and identifying relevant information that could inform instructional decision making. For example, the REFLECT step [103] can be used to assess the effectiveness of different teaching strategies, methods and resources by examining how those factors contributed to students meeting their growth targets (or not). Other types of analysis (e.g., identifying any teachers who have been particularly successful for the purpose of determining who is using methods that work) could also be included in the REFLECT step [103] and will preferably be included as appropriate for the circumstances where the inventors' technology is implemented.

Figure 2A:
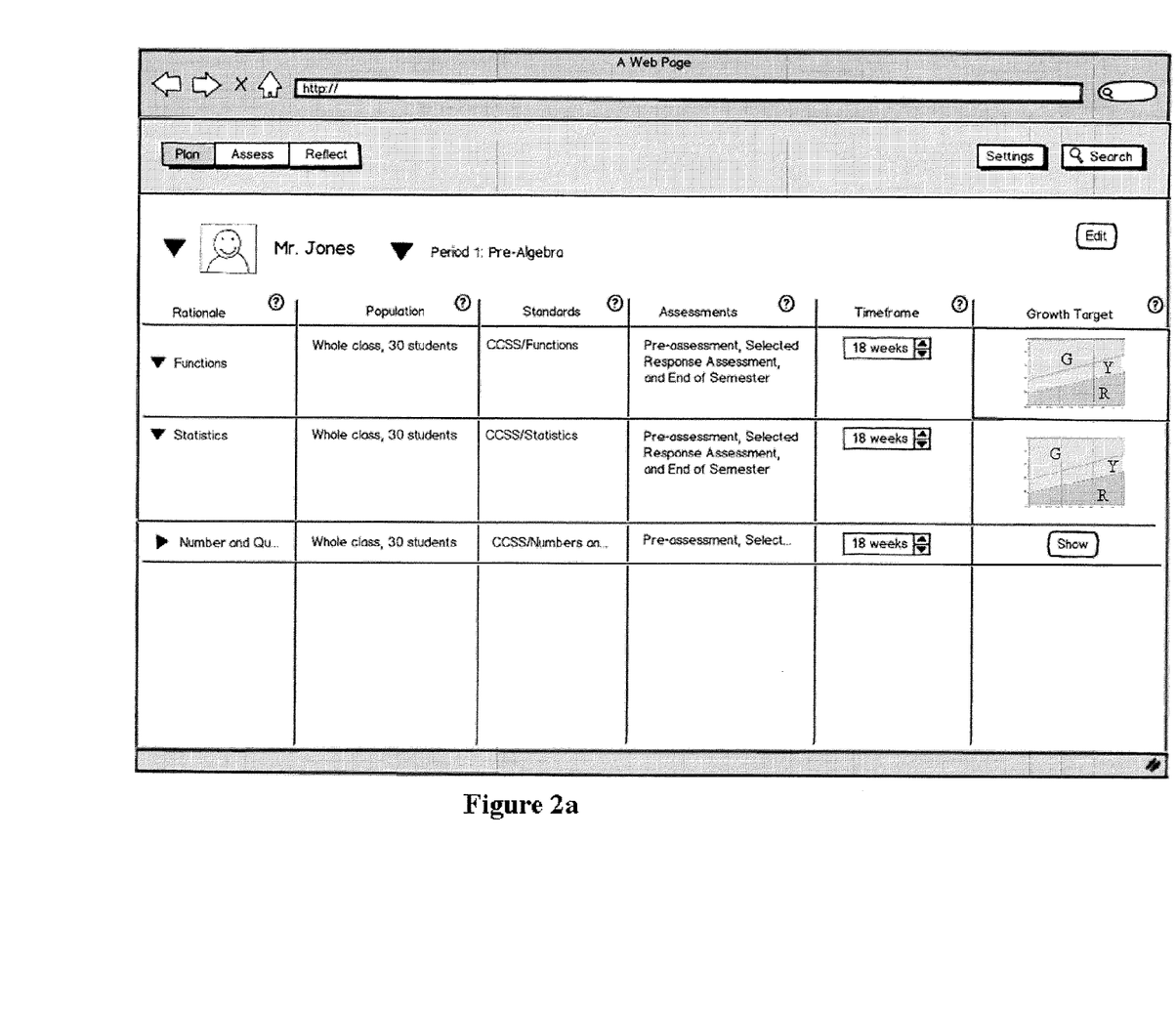
FIGS. 2a-2b depict screens that could be used to faciltiate a PLAN step.
Figure 2B:
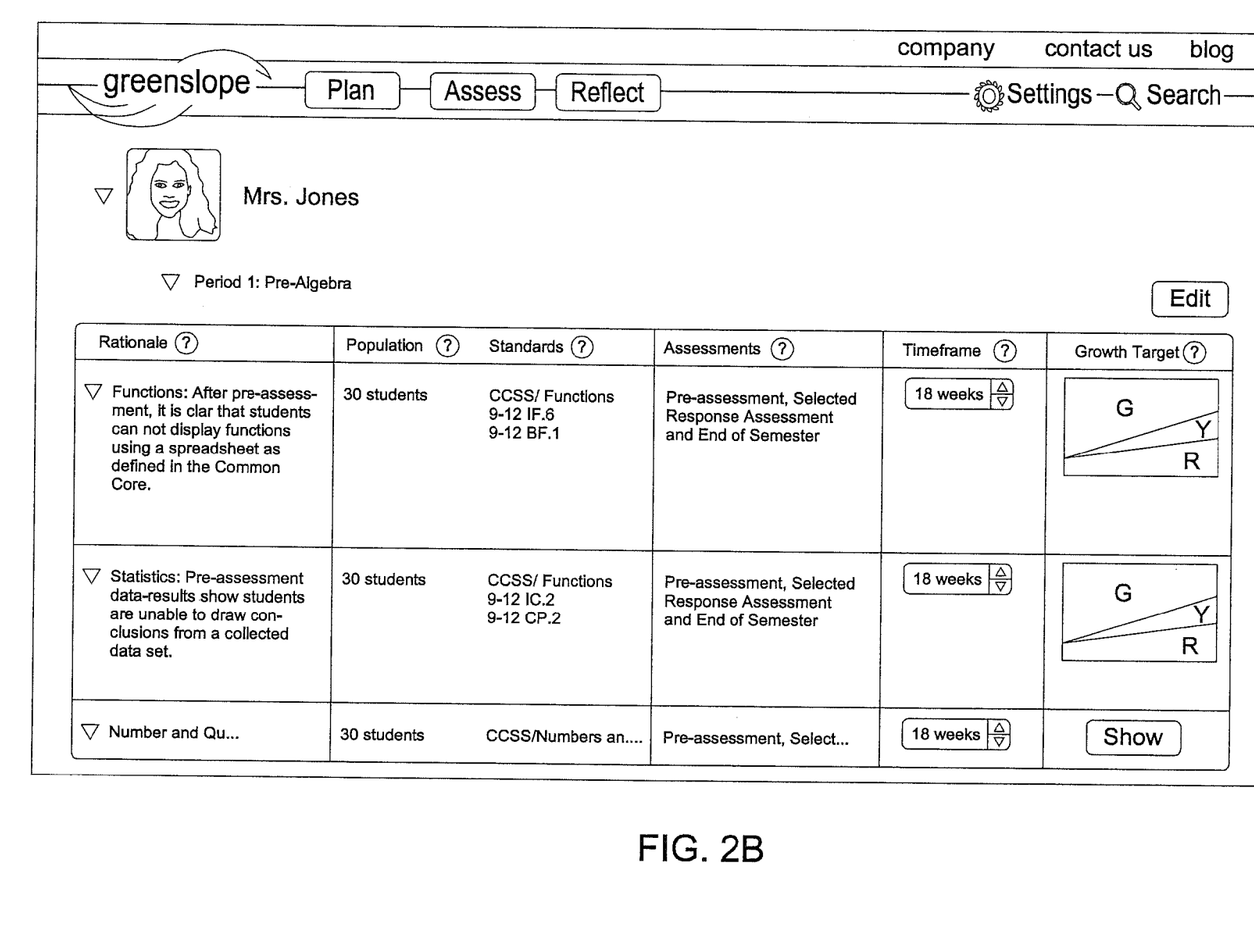

In addition to being useful in performing the methods discussed above in the context of FIG. 1, the inventors' technology could also be used to implement a software tool that could facilitate the performance of those (or related) methods. Preferably, such a software tool will include a plurality of interfaces, which will be organized according to the steps of the method of FIG. 1. For example, there could be a screen for the PLAN step [101], a screen for the ASSESS step [102], and a screen for the REFLECT step [103]. To illustrate, consider FIGS. 2a-2b, which provides illustrative screens that could be used to facilitate the PLAN step [101] from FIG. 1. As shown in those figures, a screen presented during the PLAN step [101] can be implemented to provide information about the results of each of the sub-steps for the PLAN step [101] listed in table 1. Also, in some implementations, a software tool that displays a screen such as shown in FIGS. 2a-2b could be implemented to support its users in actually performing the sub-steps listed in table 1. Examples of how a software tool could support the individual sub-steps of table 1 are set forth below in table 4, and in the following discussion of how a software tool could be used to define growth targets.

TABLE 4

Examples of how a software tool could support the sub-steps of table 1.

| Sub-Step | Support |
| --- | --- |
| Rationale | This could be supported by, for example: providing access to data that could be used to determine need (e.g., allowing a user to call up and display pre-assessment data); including fields for entry of relevant data (e.g., text fields for entering student needs, or drop-down fields of standards or skills that could be used as needed); and/or including instructions on how to perform the step (e.g., indicating that 2-4 areas of need should be identified). |
| Population | This could be supported by, for example: providing drop downs of potential populations (e.g., as determined by student demographics); and/or suggesting potential populations (e.g., by using software routines to identify correlations between potential populations and identified needs, and suggesting potential populations having the highest correlations). |
| Standard | This could be supported by, for example, providing drop down menus of potential standards. |
| Assessment | This could be supported by, for example: providing assessments that could be used in the assessment plan (e.g., assessments provided as part of the underlying software package, or assessments that could be purchased separately); including lists of assessments correlated with particular standards; and/or including a calendar of when assessments could be provided (e.g., if an assessment is a standardized test, indicating when it could be administered). |
| Timetable | This could be supported by, for example, providing a drop-down menu of standard times (e.g., 6, 9, 12, 27, or 36 weeks). |
| Growth Target | Details on how this can be performed are set forth in the text. |

Figure 3:
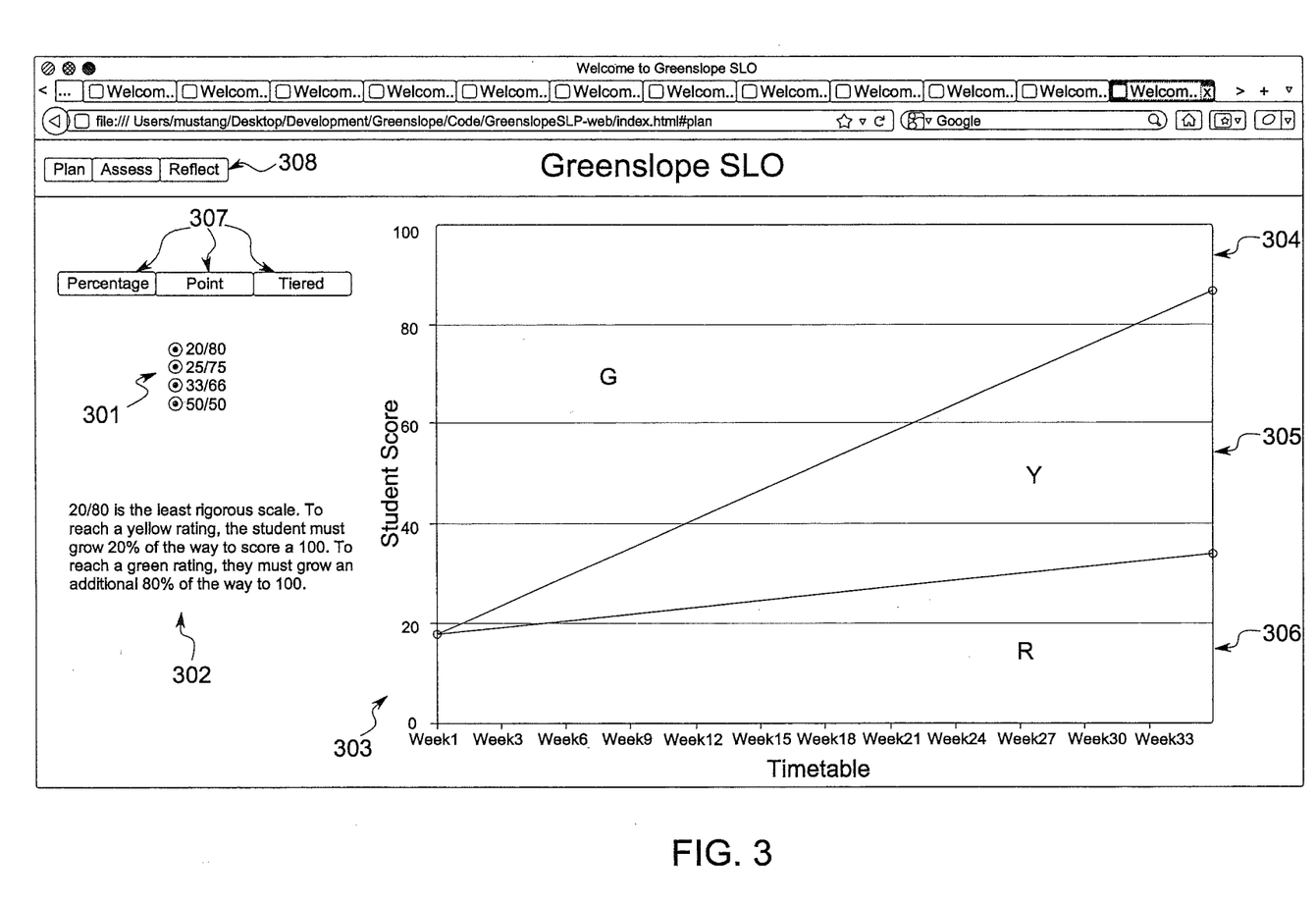
FIG. 3 depicts a screen that could be provided to a user defining growth targets using an individual percentage approach.

With respect to how a software tool could support the definition of growth targets, the specific support provided will generally vary with the type of growth target being considered. For example, FIG. 3 depicts a screen which could be provided to a user defining growth targets using the individual percentage approach described above. As shown in FIG. 3, such a screen could include components such as selectors [301] which would allow the user to choose pre-configured growth targets (e.g., the 20/80 growth target shown), an explanation of the meaning of those targets [302], and a graph [303] showing the expected growth range given the selected growth target given an exemplary initial score (e.g., the average score of students on an initial assessment, if available, with above expected growth shown in green [G][304], expected growth shown in yellow [Y] [305], and below expected growth shown in red [R] [306]). There could also be controls (e.g., buttons) that would allow the user to move to potentially defining targets in terms of other approaches (e.g., individual point improvement, tiered improvement) [307], or to other steps (or sub-steps, not shown) of the method [308]. Of course, components other than those depicted in FIG. 3 might also be presented. For example, rather than simply providing radio buttons allowing a user to select particular pre-configured growth targets, in some implementation, a user could be provided a text field or other type of control that would allow him or her to define their own targets to reach.

Figure 4:
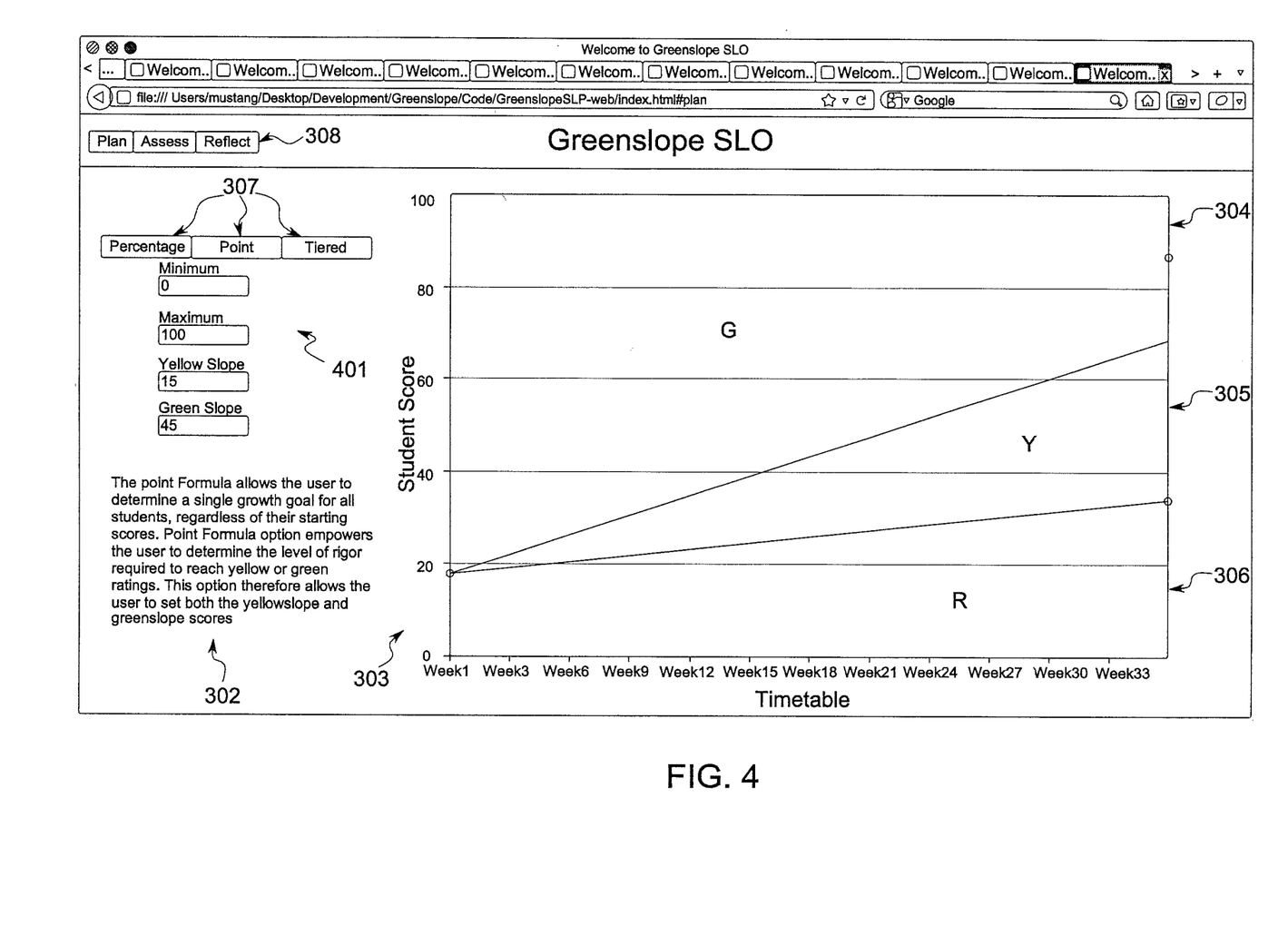
FIG. 4 depicts a screen that can be used in defining growth targets.
Figure 5:
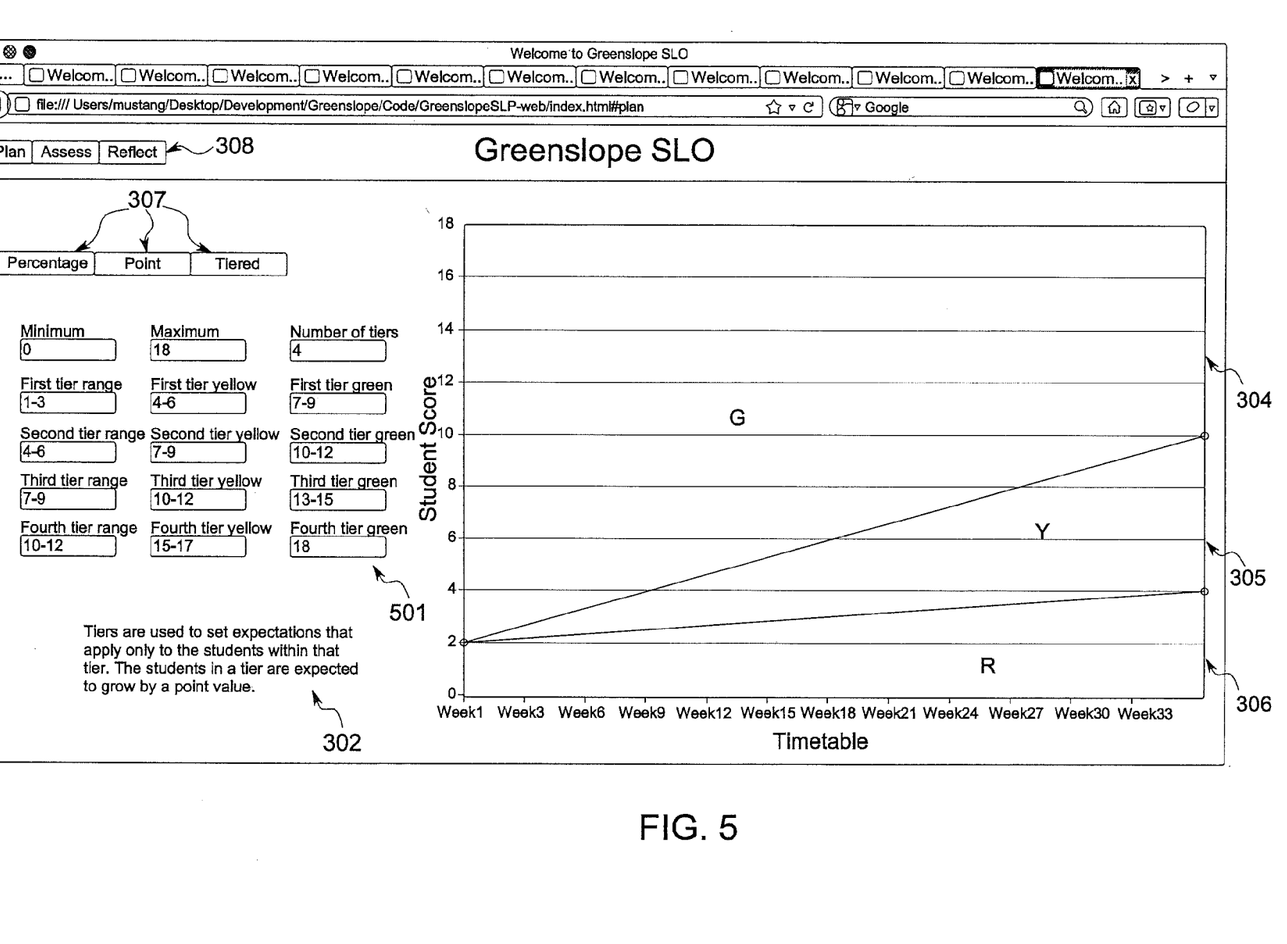
FIG. 5 depicts a screen that could be used in defining growth targets using a tiered approach.

FIG. 4 depicts a screen which, like the screen of FIG. 3, could be used to define growth targets. In particular, the screen of FIG. 4 could be used to define growth targets in terms of individual point growth. To define individual point growth targets using the screen of FIG. 4, a teacher (or other user) could enter the maximum and minimum possible scores and expected growth thresholds using the using the provided controls [401]. This information could then be provided to a software routine that would automatically generate a graph [303] showing specific improvement that would be required given the entered data for an exemplary student. A similar screen for defining growth targets using a tiered approach is provided in FIG. 5. In that screen, a user could define the tiers and their associated growth targets by simply entering the information into the text fields [501] provided. Alternatively, in some implementations, a user could simply enter maximum and minimum scores and the number of tiers desired, and the software tool could automatically generate tiers and growth targets. Similar screens could also be made available (typically to an administrator, then to a teacher) for defining other types of growth, such as teacher growth targets.

Figure 6:
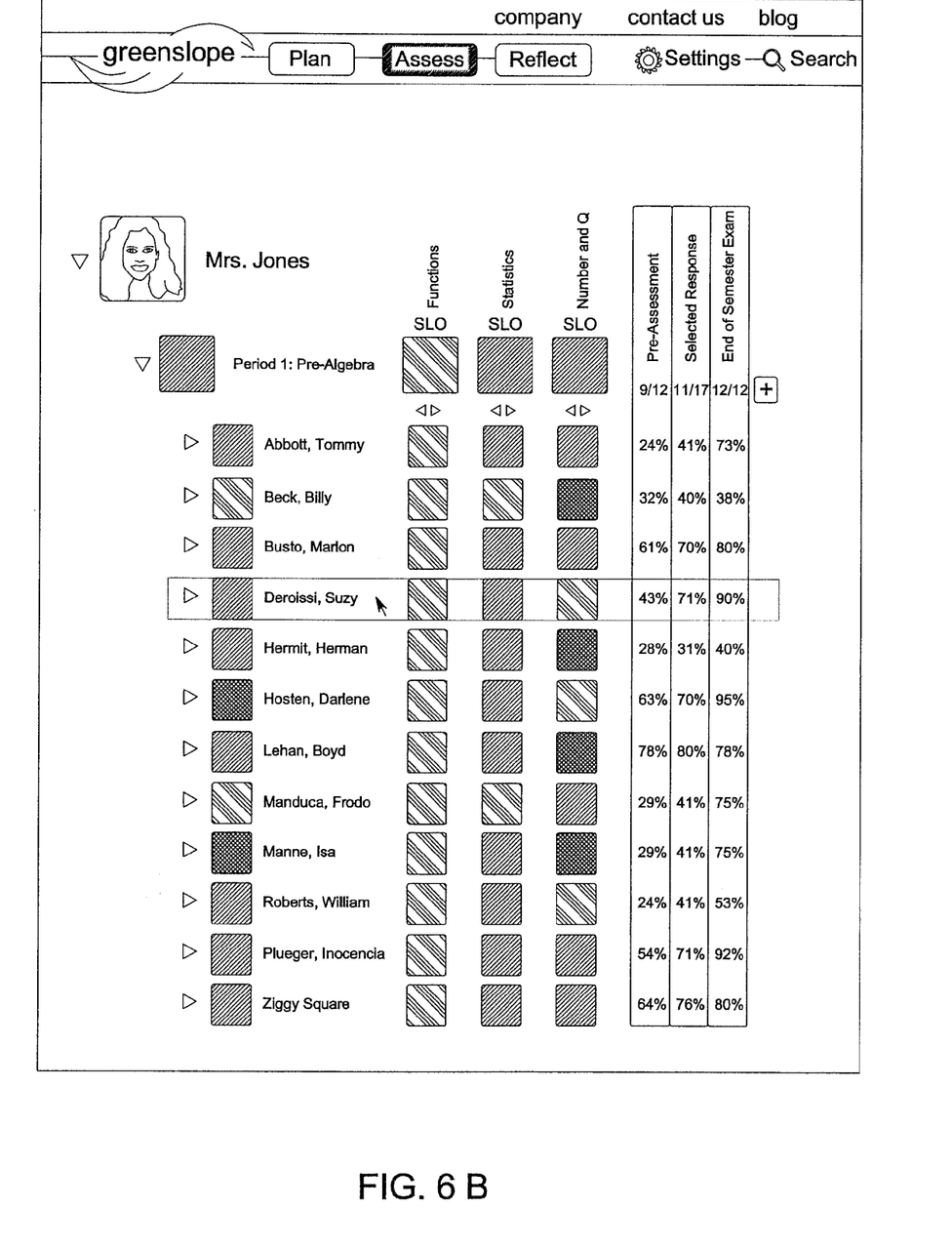
FIGS. 6a-6b depict screens that present student growth information.
Figure 6A:
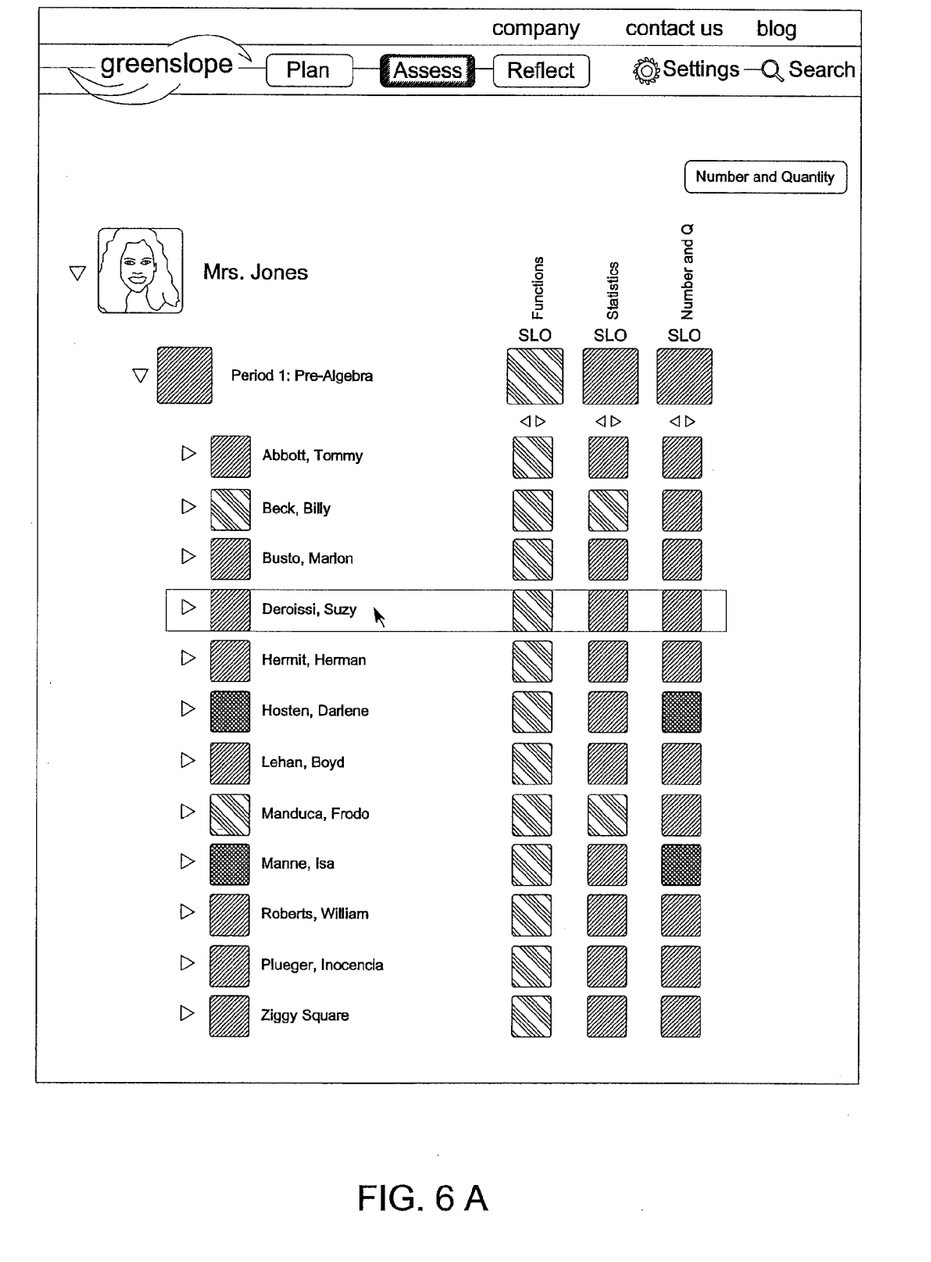

While the discussion above focused on how the inventors' technology could be used to implement a software tool that would facilitate performance of the PLAN step [101], it should be understood that such a tool could be implemented to facilitate the other steps shown in FIG. 1 as well. For example, a software tool implemented using the inventors' technology could maintain growth information for each student under study, and could provide screens that could display that growth in a color-coded manner, with red indicating that the student is not likely to achieve expected growth, yellow indicating that the student is likely to achieve expected growth, and green indicating that the student is likely to exceed expected growth. FIGS. 6a and 6b depict exemplary screens that present student growth information, with FIG. 6b providing a display that expands on the data shown in FIG. 6a.

Figure 7:
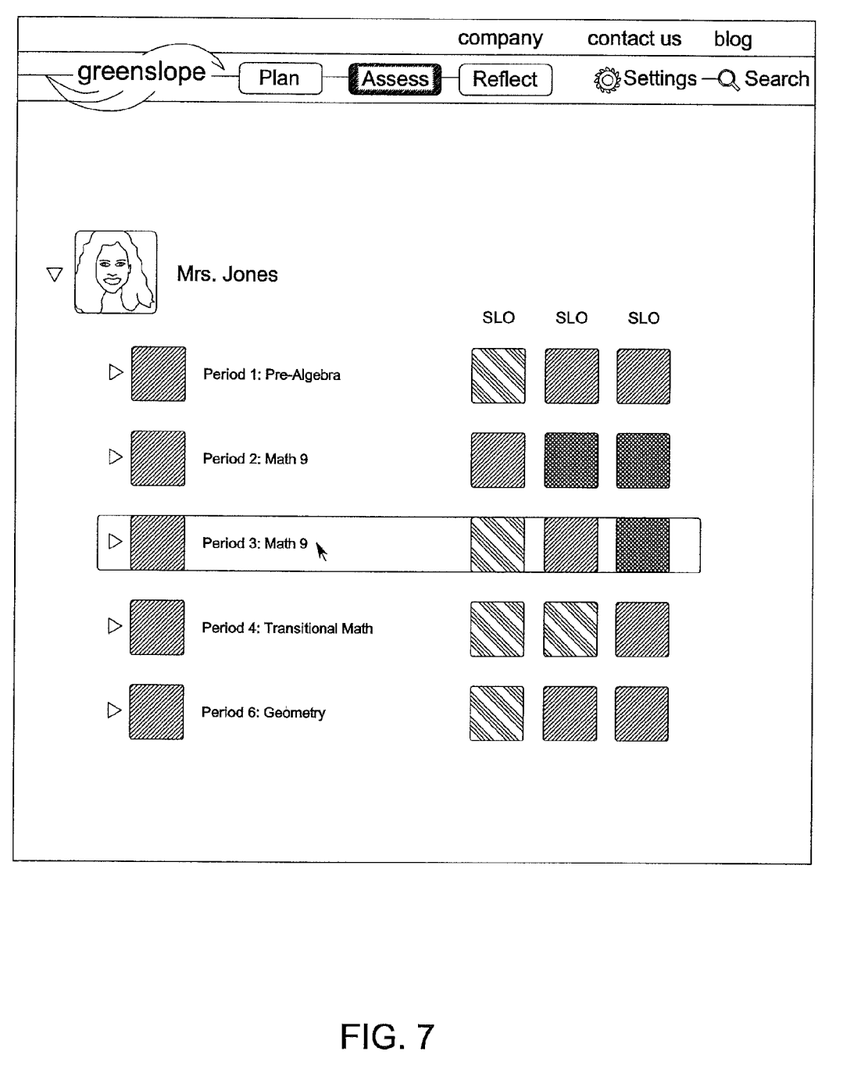
FIG. 7 depicts a screen that shows, for each class taught by a teacher, whether the teacher is likely to meet his or her goal for a particular student learning objective, and whether the teacher is likely to meet his or her goal for the class overall.
Figure 8:
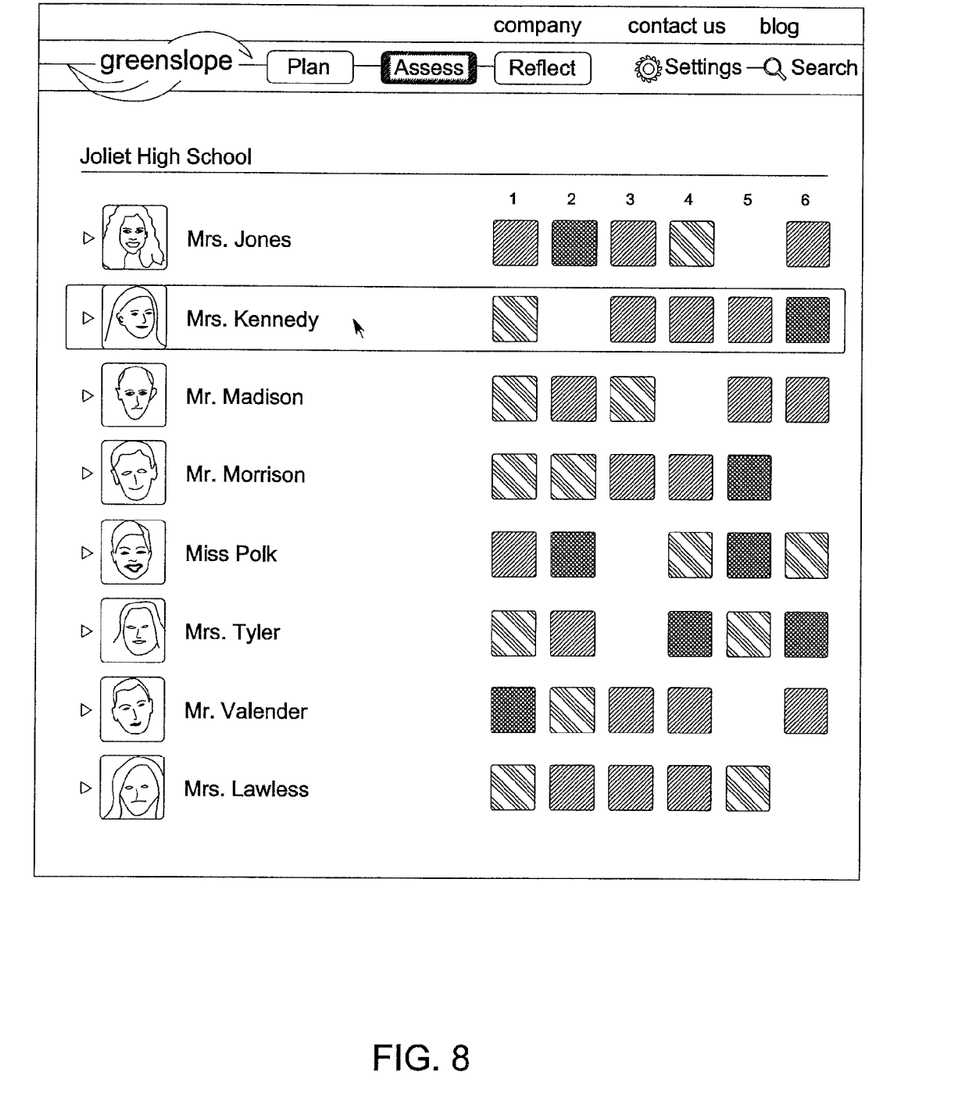
FIG. 8 depicts an interface that can be used by an administrator to see whether individual teachers under study are likely to meet their objectives for their classes.

Similar information can also be provided on an aggregated basis. For example, as shown in FIG. 7, a software tool implemented using the inventors' technology could provide a screen that would show, for each class taught by a teacher, whether the teacher is likely to meet his or her goal for a particular SLO, and whether the teacher is likely to meet his or her goal for the class overall. Aggregation can also take place at a higher level than classes. For example, FIG. 8 depicts an interface that can be used by an administrator to see, based on information obtained to date, whether individual teachers under study are likely to meet their objectives for their classes.

Of course, it should be understood that a software tool using the inventors' technology could be implemented to present interfaces other than those shown in FIGS. 6a-8 as part of facilitating an ASSESS phase [102]. For example, while the interfaces of FIGS. 6a-8 focused on providing current growth information using boxes, a software tool implemented using the inventors' technology could also automatically generate, and allow a user to review, the same information in graph form. These graphs could be substantially similar to the graphs shown in FIGS. 3-5, though they could also include additional information, such as data points showing intermediate assessments, and/or a projection line showing the student's (or other individual's) expected performance given observed results to date. Accordingly, the discussion above of how a software tool could facilitate an ASSESS step [102] should be understood as being illustrative only, and not limiting.

A software tool implemented using the inventors' technology could also facilitate completion of the REFLECT step [103] from FIG. 1. For example, such a tool could be implemented to provide a forum where individuals could view their own (or, potentially other people's, depending on the requisite individual's permissions) results and provide comments or feedback. Such a forum could also allow individuals to establish private conversations with specific other users (e.g., a teacher who wanted to communicate with an administrator about a performance review without other teachers being able to participate or observe). An example of a screen that could be presented by a software tool supporting this type of interaction during a REFLECT step [103] is presented in FIG. 9.

Figure 10:
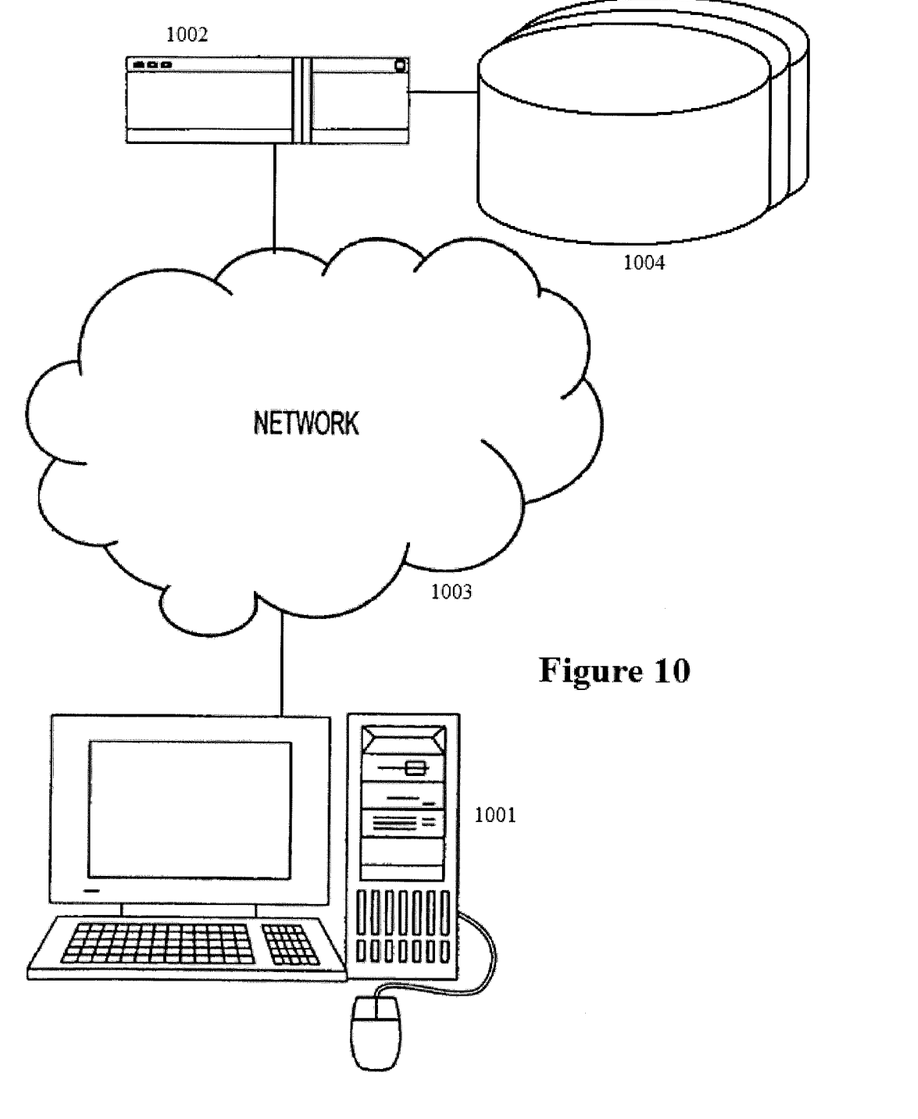
FIG. 10 depicts an architecture that could be used for a tool implemented according to this disclosure.

Turning now to FIG. 10, that Figure illustrates an architecture that can be used for a tool implemented according to this disclosure. In the architecture of FIG. 10, the primary point of interaction would be a user computer [1001], which would connect to a server [1002] over a network [1003]. The server [1002], in response to a request from the user computer [1001] could provide the user computer with an interface. For example, the server [1002] could be a web server connected to the user computer [1001] over the Internet that is configured to send HTML, Javascript, and/or other code to be interpreted by a browser on the user computer [1001] in response to a GET command. In such an implementation, the code that would be sent to the user computer [1001] could be stored on the server [1002], or one or more databases [1004], or could be dynamically generated by the server [1002] in response to a request from the user computer [1001]. Once the code is received at the user computer [1001], the user could then use the interface provided by that computer [1001] to view and/or modify data stored in the one or more databases [1004] (e.g., using a form submit command). Other interfaces in addition to a browser based interface to a web server are also possible. For example, the user computer [1001] could be provided with a special-purpose client application that would automatically interact with the server [1002] using custom data transmission protocols, rather than relying on a browser that would interpret general-purpose web design languages, such as HTML, Javascript or others. Similarly, it is possible that, rather than using an architecture with a remote server as shown in FIG. 10, in some implementations functionality such as described for the architecture of FIG. 10 could be provided locally on the user computer [1001] itself. As a result, while the examples set forth herein focus primarily on implementations that utilize an architecture such as shown in FIG. 10, that focus should understood as being illustrative only, and should not be used to limit the protection accorded by this document or any document claiming the benefit of this document to any specific architecture, including the architecture depicted in FIG. 10.

What is claimed is:

1. A method comprising:
a) presenting, to an educator via a display located proximate to the educator, an interface operable by the educator to establish a time period and target population for a student learning objective, wherein the target population for the student learning objective comprises plurality of students;
b) receiving a plurality of values specified by the educator using a multiple range specification tool presented to the educator via the display, wherein the plurality of values comprises:
i) a first goal separating a first improvement category from a second improvement category; and
ii) a second goal separating the second improvement category from a third improvement category;
c) storing the plurality of values specified by the educator via the multiple range specification tool on a non-transitory computer readable medium;
d) via a computer configured with a set of data stored on a non-transitory computer readable medium, performing a set of acts for each student comprised by the plurality of students, wherein the set of acts performed for each student comprised by the plurality of students comprises:
i) receiving an initial assessment value for the student;
ii) determining, based on the initial assessment value for the student and the plurality of values specified by the educator, a first expectation value for the student and a second expectation value for the student, wherein the first expectation value for the student separates the first improvement category from the second improvement category for the student, and wherein the second expectation value separates the second improvement category from the third improvement category for the student;
iii) receiving an interim assessment value for the student;
iv) projecting an improvement category for the student at the conclusion of the time period for the student learning objective, wherein the projected improvement category for the student is based on the interim assessment value for the student, an assessment value for the student received prior to the interim assessment value for the student, the first expectation value for the student and the second expectation value for the student; and
v) displaying an indicator of the projected improvement category for the student;
wherein the first and second expectation values determined for a first student comprised by the plurality of students are each different from the first and second expectation values determined for a second student comprised by the plurality of students; and
A) the first goal is a first percentage improvement goal;
B) the second goal is a second percentage improvement goal;
C) the first expectation value for the first student is determined using:
i) an initial percentage value; plus
ii) the result of multiplying:
I) the difference between 100% and the initial percentage value; by
II) the first percentage improvement goal;

wherein the initial percentage value is equal to the initial assessment value for the student divided by a maximum initial assessment value;
D) the second expectation value for the first student is determined using:
  i) the first expectation value for the first student; plus
  ii) a result of multiplying:
    I) the difference between 100% and the first expectation value for the student; by
    II) the second percentage improvement goal.

2. The method of claim 1 wherein the first and second expectation values for the second student are determined using the same calculations as the first and second expectation values for the first student.

* * * * *